United States Patent [19]

Priegnitz

[11] 4,228,195
[45] Oct. 14, 1980

[54] SEMI-MOIST PET FOOD PRODUCT AND PROCESS

[75] Inventor: Ronald D. Priegnitz, Algonquin, Ill.

[73] Assignee: The Quaker Oats Company, Chicago, Ill.

[21] Appl. No.: 931,203

[22] Filed: Aug. 4, 1978

[51] Int. Cl.² .............................................. A23K 3/00
[52] U.S. Cl. .................................... 426/321; 426/331; 426/332; 426/335; 426/516; 426/559; 426/560; 426/609; 426/623; 426/630; 426/646; 426/805; 426/811
[58] Field of Search ............... 426/623, 442, 496, 503, 426/518, 654, 516, 609, 805, 811, 656, 657, 445, 446, 531, 532, 559, 560, 646, 321, 335, 331, 332; 106/2; 264/300

[56] References Cited

U.S. PATENT DOCUMENTS

| | | | |
|---|---|---|---|
| 3,443,965 | 5/1969 | Birnbaum | 426/654 |
| 3,653,908 | 4/1972 | Buck et al. | 426/516 |
| 3,946,123 | 3/1976 | Hanna | 426/623 |
| 4,022,915 | 5/1977 | Zukerman | 426/805 |
| 4,070,490 | 1/1978 | Lugay et al. | 426/805 |

*Primary Examiner*—S. Leon Bashore
*Assistant Examiner*—Peter Chin
*Attorney, Agent, or Firm*—Joseph P. O'Halloran

[57] ABSTRACT

A semi-moist pet food having a moisture level in the 31-50 percent range comprising a blend of amylaceous ingredients, and proteins derived from oilseed and meat or meat by-product protein sources, and containing an effective amount of a special anti sticking agent such as for example, succinylated monoglycerides of fatty acids, to prevent stickiness and provide high processing efficiency.

14 Claims, No Drawings

SEMI-MOIST PET FOOD PRODUCT AND PROCESS

BACKGROUND OF THE INVENTION

This invention relates to a food, and more particularly to a semi-moist pet food.

Within the class of foods known as pet foods, there are three basic subdivisions—dry pet food, semi-moist pet food, and moist pet food.

In general, the dry pet food—due to its low moisture content which is usually less than about 15 percent—tends to exhibit the greatest microbiological stability and requires no special handling or package upon distribution.

At the opposite end of the spectrum is the moist pet food having a moisture content in excess of about 50 percent. Due to the high moisture content of the moist pet food, microbiological stability is a major problem. This problem in a moist pet food is overcome only by heat sterilizing the moist pet food, and by packaging the moist pet food in a hermetically sealed container. Even with heat sterilization and hermetically sealed packaging, refrigeration is required after the package of moist pet food is opened to preserve the leftover pet food for even a short time.

Semi-moist pet food has a moisture content generally ranging from about 15 to 50 percent. Since semi-moist pet foods are higher in moisture content than dry and lower in moisture than canned, special technology is required to render it microbiologically stable. This moisture content in combination with such special technology may product a microbiologically stable pet food which does not require refrigeration. At the same time, the higher moisture content of the semi-moist pet food provides an increased palatability when compared to the dry pet food.

A semi-moist food must contain a microbiological inhibitor system which will stabilize it again microbiological degradation. While almost any microbiological inhibitor system is suitable for use in the semi-moist food of this invention in an amount sufficient to provide microbiological stability, there are three systems that are especially operable for the purpose of this invention. A first system for microbiological stability may be defined as a low sugar, high polyhydric alcohol content microbiological stability system. This first system is exemplified by Canadian Patent No. 1,020,399 to Burkwall incorporated herein by reference. A second system for microbiological stability is a high acid and low polyhydric alcohol content system. This second system is exemplified in U.S. Pat. No. 4,011,345 to Bartsch incorporated herein by reference. A third system for microbiological stability is a high sugar or high water soluble solute content system. This third system is exemplified by U.S. Pat. No. 3,202,514 to Burgess, incorporated herein by reference. These systems may be used singly or in combination and with other systems so long as microbiological stability is achieved.

If the first system is used the microbiological stabilizer system for the semi-moist pet food of this invention comprises at least one polyhydric alcohol. A typical polyhydric alcohol component suitable fur use in this invention is disclosed in the Canadian Patent to Burkwall above-referenced. Preferable polyhydric alcoholds are propylene glycol and 1,3-butanediol used individually or in combination. From about 2 to 20 percent of the polyhydric alcohol alone or in combination with sugar is used to stabilize the product by preventing microbiological growth. While the sugar as above defined also contributes to the stability of the pet food by lowering the water activity, sugar is not required.

If the second system is used, a means of achieving semi-moist stability is to adjust the pH of the food product to 4–6 and use 3–9 percent polyhydric alcohol. No sugar is used or required but small amounts may be optional for flavor, or palatability. Typical foodgrade acids for use to adjust the pH in the semi-moist food include acetic acid, lactic acid, adipic acid, succinic acid, and inorganic acid such as phosphoric acid, sulfuric acid, hydrochloric acid, or mixtures theref. Furthermore, the foodgrade acid salts, which may be used to adjust the pH of the food, include monocalcium phosphate, monosodium phosphate, aluminum sulfate, aluminum ammonium sulfate, aluminum calcium sulfate, aluminum potassium sulfate, aluminum sodium sulfate, and mixtures thereof.

If the third system is used, large amounts of sugar or water soluble solutes such as polyhydric alcohols are used to substantially reduce the water activity and stabilize the food from a microbiological standpoint. Typical sugars used are sucrose and corn syrup. By "sugar" is meant any edible sugar used in the food art. Substantial examples of suitable sugars for use in the food art are listed in U.S. Pat. No. 3,302,514 to Burgess, et al. incorporated herein by reference. A suitable amount of sugar or water soluble solutes for use in this product ranges from about 15 percent by weight to about 35 percent by weight of the final product.

An antimycotic may be added to all three of the above microbial inhibitor systems in an amount sufficient to aid in preventing mold growth. The antimycotic is generally an edible antimicrobial acid or acid salt. The antimycotic is present in the food in an amount of 0 to 1 percent by weight of the pet food. More preferably, the antimycotic is present in an amount of 0.01 to 0.9 percent by weight. Typical edible acids and their salts suitable for antimycotic use include benzoic acid, the benzoate salts, the paraben salts, propionic acid, and the propionate salts, acetic acid and the acetate salts, sorbic acid and the sorbate salts and mixtures thereof. Especially preferred antimycotics are potassium sorbate and sorbic acid.

Various other common additives from 0 to about 25 percent may also be added to the food whether it is a semi-moist food or not. Fat is usually added in an amount from 0 to about 12 percent by weight of the final product depending on how much fat is naturally contained in the meat or meat by-products used. The fat may be of either animal or vegetable origin. A preferred fat for use in a pet food is an animal fat exemplified by prime steam lard, tallow, and choice white grease, although fish and chicken fat, cotton seed, corn oil, soy oil, peanut oil, sunflower oil and other vegetable oils can be used.

For flavor and nutritional purposes common additives include a variety of salts to be added to this pet food. Typical salts suitable for use in this invention include iodized salt, regular salt, potassium chloride, and other suitable edible salts. Vitamins, supplements, mineral supplements, colorings, flavorants and antioxidants are generally present in the pet food in a sufficient amount (generally about 0 to about 5 percent) to provide nutrition and to add to overall appearance. Included in the vitamin and mineral supplements ae ingredients such as choline chloride, magnesium oxide, vitamin A, $B_{12}$, $D_3$, and E, riboflavin, niacin, folic acid, pyridoxine hydrochloride, thiamine mononitrate, calcium pantothenate and other suitable vitamins and minerals.

Generally speaking, within the moisture range of food products which are characterized as semi-moist, the higher moisture-containing products are found to be more palatable.

Nonetheless because of processing problems the upper limit of moisture contents for many highly advantageous combinations of ingredients has been believed to be about 30 percent. (See Burgess U.S. Pat. No. 3,202,514.) For example, above 30 percent moisture level pet foods containing combinations of oil seed protein sources and meat based protein blends and amylaceous based nutrients are found to exhibit stickiness before and after extrusion, and during storage, which renders the formulation using such combinations substantially unusable in commercial production operations.

Admixed semi-moist pet food ingredients are conventionally conveyed to a cooker-extruder using screw-type conveyor-feeders. The use of an ingredient formulation which exhibits substantial stickiness causes considerable problems with respect to erratic flow of the ingredients through the pre-cooker-extruder conveying system. Also, the extruded semi-moist pet food is conventionally cut at the point of extrusion or shortly thereafter using a multiplicity of rotating knives, dicers, or other conventional cutting equipment. With respect to the use of high speed rotating knives, the semi-moist product is necessarily thrown at high speed and often hits against the walls of safety shields surrounding the high speed cutting systems, and is ultimately thrown onto a conveyor positioned substantially below the point of extrusion and cutting. Contact of a sticky product with the walls of the shield can cause the product to adhere to the wall of the shield. Subsequent contact with the following recently cut material leads to cohesion and possibly obstructive build-up of material within the knife shield system. Also, the discrete particles falling on the conveyor, should desirably remain as discrete particles but it is most likely that, with a sticky product, the discrete particles will cohere to one another on the conveyor forming irregular masses of shapes.

Likewise the semi-moist pet foods are conventionally processed at high speeds through apportioning and packaging equipment in which it is absolutely essential that discrete particles of the product be readily separated into the desired portions at high speeds. Whenever a formulation results in a sticky product such high speed apportioning and packaging is rendered virtually impossible. The economy of products made available to the ultimate consumers depends, to a great measure, on the output rate of the commercial manufacturing and packaging equipment.

Semi-moist pet foods having moisture levels in the range 31-50 percent inclusive containing blends of oil seed protein source ingredients with meat protein source ingredients, and amylaceous ingredients, upon mixing as well as upon extrusion are usually so sticky and cohesive that the extrusion of discrete particles results in clumping and cohesion to such an extent that the problems discussed above are encountered and the normally used packaging and handling equipment are rendered useless.

SUMMARY OF THE INVENTION

It is an object of this invention to provide an improved process and a high moisture semi-moist pet food comprising a blend of oil seed derived protein ingredients and meat-derived protein ingredients with amylaceous ingredients, having relatively high moisture levels in the range 31-50 percent which does not exhibit stickiness to such as extent that high production efficiency is lost.

It is a further object of this invention to provide a semi-moist pet food having the characteristics described hereinbefore which, because of the relatively low cohesion at normal storage conditions, maintains its discrete particulate character after being packaged. It is another object of this invention to provide commercial formulations and methods for high output production of semi-moist pet foods of the type described with the addition of relatively low amounts of a special anti sticking agent for elimination of the undesirable stickiness and cohesion.

These and other objects of this invention which will be apparent hereinafter are achieved in accordance with the invention which is described in general herein, and with respect to particularly preferred embodiments which are set forth hereinafter.

DESCRIPTION OF THE PREFERRED EMBODIMENTS

A semi-moist pet food containing a blend of oil seed protein source ingredients, meat-derived protein source ingredients, and amylaceous ingredients, and containing moisture in the range 31-50 percent can be produced without substantial stickiness at high output rates in conventional equipment upon the addition of an effective amount of a special anti sticking agent comprising a polybasic acid ester of fatty acid monoglycerides and diglycerides. A preferred anti sticking agent in accordance with the present invention is succinylated monoglyceride. The preferred concentration of the anti sticking agent in the pet food formulation is an effective amount in the range of 0.01-0.45 percent, 0.05-0.25 percent inclusive being the preferred range.

On the other hand, use of the special anti sticking agent at even relatively slightly higher concentrations, e.g. 0.5 percent has been found to be unacceptable inasmuch as the extruded product has been found to be too "greasy" lacking, cohesion and elasticity, and will not maintain its desired shape.

The preferred amylaceous ingredients are used in formulations in accordance with the present invention in the range 5 to 50 percent. The preferred amylaceous ingredients are ground whole wheat, ground whole corn, ground whole oats, rolled oats, wheat flour, corn flour, oat flour and mixtures thereof. However, successful products can be produced with other cereal grain derivatives. Typical other amylaceous ingredients include, but are not limited to, amylose, barley, rice, wheat starch, corn starch, waxy maize corn starch, other modified starches and mixtures thereof.

A second essential ingredient is a protein source ingredient derived from the oil seed family. The preferred oil seed-derived protein source ingredients are soy flour, and soy bean meals. Other oil seed-derived protein ingredients include soy bean proteins, rape seed, peanut, flax seed, cotton seed, sunflower seed and other oil seed proteins and mixtures thereof. The particular oil seed-derived ingredients are suitable for use in the pet food either as a full fat seed, a meal, a concentrate, an isolate, a flour, or mixtures thereof. Usage levels are 5-50 percent with a preferred range being 5-40 percent.

The third essential ingredient in the combination of ingredients and the second essential protein source for use in accordance with the present invention is animal protein such as that derived from meat, meat by-products and other animal protein sources and mixtures thereof.

By "meat" is meant the flesh of cattle, swine, sheep, goat, horses, whale and other mammals, poultry and fish. By "meat by-products" is meant those things shown in the 1975 negotiation of American Feed Control Officials, Inc. under No. 9 Animal Products which defines meat by-products as the non-rendered clean wholesome part other than meat derived from slaughtered animals. Meat by-products include, but are not limited to lungs, spleen, kidneys, brains, livers, blood, partially fatted low temperature tissues, and stomachs, and intestines free of their contents. Thus animal protein, as used herein, is intended to include such materials as animal liver meal, animal liver and glandular meal, extracted animal liver meal, whale meal, meat and bonemeal, animal by-product meal, dried meal solubles, meat meal, fish meal, fish protein concentrate, poultry parts, poultry by-products, poultry by-product meal, blood meal, milk products and egg products. Generally speaking, any one of the above named meat, meat by-products, or animal protein products may be used in the semi-moist pet food. Also mixtures of two or more of the meat by-products or other animal protein sources may be used in the semi-moist pet food. Additionally meat, meat by-products, and other animal protein source mixtures are suitable for use in the pet food of this invention.

Generous use of the above referenced meat, meat by-product and other animal protein sources is desired from a palatability viewpoint, and use of these ingredients in the ranges specified is essential in the combination in accordance with the present invention. Usage levels of these ingredients range from 5 to about 50 percent, more preferably 7-40 percent, and the most preferred range is from 10 to 35 percent inclusive.

In addition to protein derived from these essential sources in accordance with this invention, namely, from oil seed, and meat or meat by-products, additional protein can be employed, e.g. cereal-derived proteins. Total protein in the pet food is customarily 10-15 percent dry basis, and in our product we prefer to provide protein in the range including 15-40 percent, and most preferably in the range including 20-40 percent.

Conventionally employed microbiological stabilizing ingredients are also essential in the semi-moist product of this invention, and all of the systems referred to hereinbefore are useful in the product and method of this invention. Likewise, conventional additional ingredients such as fats, flavors, vitamins, minerals, seasonings can be added optionally to the method and product of this invention.

The moisture content of the pet food in accordance with the present invention ranges from 31 to 50 percent, although the more preferred moisture level is between 31 and 40 percent inclusive. By "moisture" is meant the total water, including water present in the admixed ingredients and the water added as such. Below 30 percent moisture the stickness which is eliminated by the anti sticking agent is not a serious problem when the oil seed, meat source and amylaceous blend is employed. Above 50 percent moisture, the microbiological stability problems are excessive for conventional semi-moist product packaging.

The special anti sticking agents for use in accordance with the present invention are selected from the class of polybasic acid esters of fatty acid mono and diglycerides of the formula:

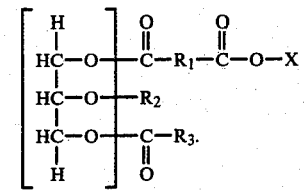

wherein X includes, H, Na+, K+, Ca++;

$R_1$ includes $(-C_N H_{2N}-)$ wherein N is an integer from
from 1-10 inclusive,

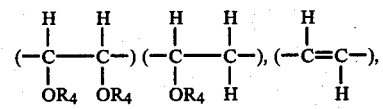

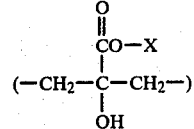

wherein $R_4$ is H,

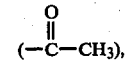

or $(-CH_3)$, and X is defined above $R_2$ is H or fatty acid substituent as defined hereinafter having 6-24 carbons;

$R_3$ is the substituent whereby

is the fatty acid substituent as defined herein having 6-24 carbons;
and wherein the use of the brackets is intended to denote that any of the substituents at the right of the brackets may be positioned at any of the glyceride substituent positions of the glyceride substituent denoted at the right within the brackets.

Other preferred dibasic acid substituents in the special anti sticking agent of this invention include, malic, fumaric, citric, adipic, and succinic as well as the diacetylated malic and tartaric acids. The diacetylated tartaric mono and diglycerides suitable for use in this invention are commercially available under the trademark PANODAN (T. M. Grindsted Industries) and is also available under the trademark MYVATEM (T. M. Eastman). The most preferred anti sticking agent for use in this invention is the succinylated mono glyceride which is commercially available as MYVATEX (T. M. Eastman) SUPER DO (T. M. Eastman). The fatty acid mono and diglycerides which are esterified with the dibasic acids to form the preferred glycerol mono esters of the dibasic fatty acids include glycerides of saturated and unsaturated straight chain and branched fatty acids having from 6–24 carbons, included. These substituents can include, but are not limited to n-undecylic, lauric, n-tridecylic, myristic, n-pentadecylic, palmitic, margaric, stearic, and n-nonadecylic, arachidic, n-hensicosic, behenic, and n-tricosoic, lignoceric, and n-pentacosoic, lauroleic, physeteric, myristoleic, palmitoleic, petroselinic, petroselaidic, oleic, elaidic, vaccenic, galoleic, linoleic, linoleladic, linolenic, and the like. Glycerides of myristic, oleic, linoleic, linolenic, palmitic and stearic acids are preferred constituents in the dibasic acid ester anti sticking agent of this invention. Inclusion of substantial levels of mono glycerides and diglycerides of fatty acids does not have an adverse effect on the anti sticking agent in accordance with the present invention. In fact, the composition of preferred commercially available ingredients is reported to consist of one third mono glyceride and two thirds succinylated mono glyceride. However, mono and diglycerides of fatty acids without the special anti sticking agent of this invention do not prevent the stickiness in the high moisture semi-moist foods.

In accordance with a preferred embodiment of the present invention, a powdered blend of succinylated mono glycerides and distilled mono glycerides prepared from edible hydrogenated vegetable oil, and commercially available under the trade name MYVATEX SUPER DO (T. M. Eastman Chemical Products, Inc.) is employed at a level of about 0.05–0.35 percent by weight based on the weight of the formulation.

Generally speaking, the special anti sticking agent of the present invention is utilized in the form of a very fine powder, and is initially admixed in the proper amounts with the dry finely ground solid ingredients in the formulation. Thereafter, the wet ingredients are admixed with the dry ingredients to thoroughly integrate the materials, for example, using either batch or continuous mixers, to form a uniform admixture. Thereafter, it is processed in a cooker-extruder under either expanding or non-expanding conditions. In order to produce an expanded product, temperatures above about 212° F. are usually employed. At constant moisture levels, the degree of expansion increases as the temperature rises above 212° F. until ultimately a textural collapse in observed. At the temperature at which textural collapse is observed upon expansion, the piece strength is lost due to over expansion. Successful expansion with minimum distortion can be accomplished up to 260° F., for example, although the preferred range is 212°–240° F. At these temperatures, (212°–260° F.) the degree of expansion of the product in accordance with this invention can be expected to range from approximately 2.5–5.2 cubic inches per ounce (1.3–3.0 cm³/g) with a desired range of 3.2–5.2 cubic inches per ounce (1.8–2.4 cm³/g). The residence time in the extruder cooker, whether under expanding or non-expanding conditions, is conventionally a sufficient period of time for substantial pasteurization to be achieved. Also, under such processing conditions, the starches present are substantially gelatinized.

When a non-expanded product is desired, the extrusion temperatures are maintained substantially below 212° F. For example, temperatures in the range 150°–212° F. are eminently satisfactory.

The process in accordance with the present invention after extrusion is entirely conventional, with conventional cutters, conveyors, proportioners, and packaging equipment being employed.

Having thus described the invention, the following examples are presented to more fully illustrate without unduly limiting the invention and to exemplify the profound differences which are observed in accordance with the method and product of the present invention.

In the examples and throughout the specification all parts and percentages are by weight unless otherwise specified.

EXAMPLE 1

Three batches of semi-moist pet food are prepared in accordance with the formulations set forth in Table I.

TABLE I

| Ingredients | Formula A | Formula B | Formula C |
|---|---|---|---|
| Beef Tripe | 30 | 30 | 30 |
| Soybean Flour | 26 | 26 | 26 |
| Wheat Flour | 14 | 13.85 | 13.85 |
| Corn Syrup (D.E. 42) | 10 | 10 | 10 |
| Propylene Glycol | 6.0 | 6.0 | 6.0 |
| Phosphoric Acid | 1.5 | 1.5 | 1.5 |
| Misc. (salt, vitamins, flavor) | 6 | 6 | 6 |
| Myvatex Super Do | None | 0.15 | None |
| Myverol* | None | None | 0.15 |
| Water to Make up 100% parts | 6.5 | 6.5 | 6.5 |
| | 100 | 100 | |
| Moisture Content after Extrusion | 35 | 35 | 35 |

*Distilled mono glyceride emulsifier (T.M. Eastman).

In Table I, Formula A and C do not include the succinylated fatty acid mono glyceride, and consequently are not in accordance with the present invention. Formula B, however, is a formulation in accordance with the present invention.

The above respective ingredients are mixed to form separate doughs and are separately extruded at temperatures of approximately 200° F. Formula A and C gives a product which is extremely sticky, and in which the discrete extruded particles evidence extreme cohesion and adhesion making it very difficult to process as a consequence of the stickiness while in the cutting, conveying equipment, metering, and packaging equipment.

Formula B, on the other hand, shows substantially complete elimination of stickiness, enabling high output processing in conventional conveyors, metering equipment and packaging equipment.

Comparison of product of formula B and C reveals that although identical quantities of conventional emulsifying agents do not eliminate the stickiness, the special anti sticking agent in accordance with this invention does eliminate stickiness.

Formula B, produces a product which is very palatable, and when compared with otherwise identical formulations having moisture levels in the range 20–30 percent, for example, exhibits superior palatability.

The product of Example 1 is, of course, a non-expanded product.

EXAMPLE 2

The purpose of this example is to illustrate an embodiment of the present invention which is produced by a method utilizing the expanding extrusion conditions.

Three separate formulations of semi-moist pet food were prepared in accordance with the formulations set forth in Table II.

TABLE II

| Ingredients | Formula A | Formula B | Formula C |
|---|---|---|---|
| Meat and Bone Meal | 14.0 | 14.0 | 14.0 |
| Wheat Feed Flour | 16.0 | 15.80 | 15.80 |
| Soy Flour | 10.0 | 10.0 | 10.0 |
| Oat Flour | 9.0 | 9.0 | 9.0 |
| Glycerol | 8.0 | 8.0 | 8.0 |
| Animal Fat | 5.0 | 5.0 | 5.0 |
| Corn Flour | 4.0 | 4.0 | 4.0 |
| Salt, Vitamins, Minerals, Coloring, Flavoring | 2.0 | 2.0 | 2.0 |
| Phosphoric Acid | 2.0 | 2.0 | 2.0 |
| Succinylated Mono glyceride | — | 0.20 | — |
| Myverol (Mono-diglyceride blend) | — | — | 0.20 |
| Water | 30.0 | 30.0 | 30.0 |
|  | 100.0 | 100.0 | 100.0 |
| Moisture after extrusion | 34 | 34 | 34 |

In Table II, Formula A and C do not include the special anti sticking agent of this invention (succinylated fatty acid monoglyceride) and consequently are not in accordance with the present invention. Formula B, however, is a formulation in accordance with the present invention. The respective ingredients are, as in Example 1, initially admixed, first the dry ingredients being thoroughly admixed, and subsequently the wet ingredients being admixed therewith. However, the respective separate doughs produced in accordance with the Formula A, B, and C, are extruded, in accordance with this example, under expanding conditions. The products were, in each case, expanded to between 3.0 and 3.5 cubic inches per ounce.

Formula A and C gives a product which is extremely sticky, and which clumps together rendering it substantially impossible to process using conventional conveying, proportioning and packaging equipment. Formula B, on the other hand, shows substantially complete elimination of stickiness, enabling high output processing of the discrete pieces in conventional conveyors, metering equipment and packaging equipment. This is particularly surprising in view of the fact that the product, in each case, had substantially the same amount of water (34 percent) and the successful production in accordance with the present invention (Formula B) had only 0.20 percent of the special anti sticking agent in accordance with the present invention.

A comparison of Formula C with Formula B shows that a conventional emulsifying agent used in the same amount, does not eliminate the stickiness.

The amount of the anti sticking agent which is used in accordance with the present invention is an effective amount which is readily determined on simple experimentation. Generally speaking a relatively broad range, within the defined range, will be useful. However, at the higher moisture levels the effective amount of the special conditioner in accordance with the present invention, depending on the particular formulation employed, will be in the upper portion of the specified range.

Having thus fully disclosed and described this new invention, what is claimed and sought to be executed by letters patent is as follows:

I claim:

1. An extruded non sticking particulate semi-moist pet food containing moisture in the range 31–50 percent, and a blend of oil seed-derived protein source ingredient in an amount between 5 and 50 percent, meat-derived protein source ingredient in an amount between 5 and 50 percent, fat in an amount from 0 to 12 percent and amylaceous ingredients in an amount between 5 and 50 percent, as well as sufficiently high concentration of other components to provide microbiological stability, the improvement comprising the addition thereto of an effective anti sticking amount of a mono ester of a polybasic acid having 3–10 carbons, inclusive, of a member selected from the group fatty acid mono glyceride and fatty acid diglyceride, the fatty acid having from 10–24 carbons, said esters being present in an amount between 0.1 percent and 0.45 percent by weight.

2. The composition of claim 1 in which the glycerol ester is a succinylated mono glyceride of fatty acid.

3. The composition of claim 2 in which the amylaceous ingredient is selected from the group, wheat flour, ground whole wheat, ground whole corn, corn flour, oat meal, oat flour, and the oil seed is soybean, and the moisture level is in the range 31–40 percent, inclusive.

4. An extruded non sticking particulate semi-moist pet food containing moisture in the range 31–50 percent, and a blend of oil seed-derived ingredient in an amount between 5 and 50 percent, meat-derived ingredient in an amount between 5 and 50 percent, fat in an amount from 0 to 12 percent, and amylaceous ingredient in an amount between 5 and 50 percent, as well as sufficiently high concentration of other components to provide microbiological stability, the improvement comprising the addition thereto of an effective anti sticking amount of a member selected from the group of mono ester of a polybasic acid of fatty acid mono and diglycerides of the formula:

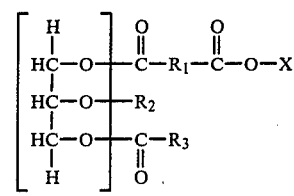

wherein X includes, H, Na+, K+, Ca++, $R_1$ includes ($-C_N H_{2N}-$) wherein N is an integer from 1-10 inclusive,

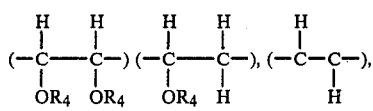

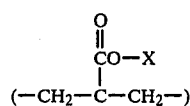

wherein $R_4$ is H,

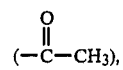

($-CH_3$), and X is defined above; and $R_2$ is H or fatty acid substituent having 6-24 carbons;

$R_3$ is the substituent whereby $$-\overset{\overset{\displaystyle O}{\|}}{C}-R_3$$

is a fatty acid substituent having 6-24 carbons; and wherein the use of the brackets is intended to denote that any of the substituents at the right of the brackets may be positioned at any of the glyceride substituent positions of the glyceride substituent denoted at the right within the brackets.

5. Composition of claim 4 in which the glyceryl ester is succinylated mono glyceride of fatty acid.

6. Composition of claim 5 in which the amylaceous ingredient is a member selected from the group wheat flour, ground whole wheat, ground whole corn, corn flour, oat meal, oat flour, and in which composition the oil seed is soybean, and the moisture level is 31-40 percent inclusive.

7. In a method for manufacturing a non sticking particulate pet food having moisture levels in the range 31-50 percent, fat in an amount from 0 to 12 percent, amylaceous ingredients in the range 5-50 percent, oil seed-derived protein source ingredients in the range 5-50 percent, meat-derived protein source ingredients in the range 5-50 percent, and total protein in the range 10-50 percent, said pet food having sufficiently high concentration of other components to provide microbiological stability and in which all the ingredients are intimately admixed to form a dough-like mass, and in which the resulting dough-like mass is extruded at temperatures in the range 150° F.-260° F., and the extruded product is cut into discrete pieces, the improvement comprising: admixing with the ingredients an anti sticking agent selected from the group of polybasic acid mono esters of fatty acid mono and diglycerides of the formula:

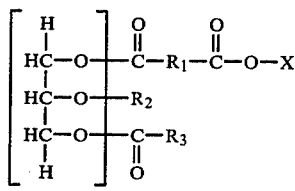

wherein X includes, H, Na+, K+, Ca++;

$R_1$ includes $(-C_N H_{2N}-)$ wherein N is an integer from 1-10 inclusive, $$\left(-\overset{\overset{\displaystyle H}{|}}{\underset{\underset{\displaystyle OR_4}{|}}{C}}-\overset{\overset{\displaystyle H}{|}}{\underset{\underset{\displaystyle OR_4}{|}}{C}}-\right)\left(-\overset{\overset{\displaystyle H}{|}}{\underset{\underset{\displaystyle OR_4}{|}}{C}}-\overset{\overset{\displaystyle H}{|}}{\underset{\underset{\displaystyle H}{|}}{C}}-\right), \left(-\overset{\overset{\displaystyle H}{|}}{C}=\overset{\overset{\displaystyle H}{|}}{C}-\right),$$

$$\left(-CH_2-\underset{\underset{\displaystyle OH}{|}}{\overset{\overset{\displaystyle CO-X}{|}}{C}}-CH_2-\right)$$

wherein $R_4$ is H, $$\left(-\overset{\overset{\displaystyle O}{\|}}{C}-CH_3\right),$$

or $(-CH_3)$, and X is defined above; and $R_2$ is H or fatty acid substituent having 6-24 carbons;

$R_3$ is the substituent whereby $$-\overset{\overset{\displaystyle O}{\|}}{C}-R_3$$

is the fatty acid substituent having 6-24 carbons; and wherein the use of the brackets is intended to denote that any of the substituents at the right of the brackets may be positioned at any of the glyceride substituent positions of the glyceride substituent denoted at the right within the brackets.

8. The method of claim 7 wherein the polybasic acid ester is an ester of succinic, tartaric, malic, fumaric, citric, and mono and di acetyl esters of tartaric acid.

9. The method of claim 7 wherein the amylaceous ingredient is wheat flour, and the oil seed ingredient is derived from soybean.

10. The method of claim 7 in which the moisture is 31-36 percent, and the anti sticking agent is used in an amount sufficient to provide between 0.1 and 0.35 percent by weight in the product.

11. The method of claim 7 in which the extrusion takes place under non-expanding conditions.

12. The method of claim 7 in which the extrusion takes place under expanding conditions.

13. The method of claim 7 in which the anti sticking agent is succinylated mono glyceride of fatty acid.

14. The method of claim 13 in which the succinylated mono glyceride is added as a powder in the presence of a member selected from the group mono and diglycerides of fatty acids.

* * * * *